United States Patent
Ikeda

(10) Patent No.: US 9,328,772 B2
(45) Date of Patent: May 3, 2016

(54) CENTER BEARING SUPPORT

(75) Inventor: Masahiro Ikeda, Saihakugun (JP)

(73) Assignee: NOK Corporation (JP)

( * ) Notice: Subject to any disclaimer, the term of this patent is extended or adjusted under 35 U.S.C. 154(b) by 265 days.

(21) Appl. No.: 13/613,557

(22) Filed: Sep. 13, 2012

(65) Prior Publication Data

US 2013/0068921 A1    Mar. 21, 2013

(30) Foreign Application Priority Data

Sep. 16, 2011 (JP) .................. 2011-203047

(51) Int. Cl.
| | |
|---|---|
| *F16C 35/04* | (2006.01) |
| *F16C 27/06* | (2006.01) |
| *F16C 33/80* | (2006.01) |

(52) U.S. Cl.
CPC ............. *F16C 35/04* (2013.01); *F16C 27/066* (2013.01); *F16C 33/80* (2013.01); *F16C 33/805* (2013.01); *F16C 2326/30* (2013.01)

(58) Field of Classification Search
CPC ........ F16C 21/04; F16C 35/04; F16C 27/066; F16C 33/80; F16C 2236/30; F16C 33/805; F16C 27/06; F16C 27/00
USPC .......... 248/560, 562, 635; 384/536, 535, 582, 384/581, 544
See application file for complete search history.

(56) References Cited

U.S. PATENT DOCUMENTS

| | | | | |
|---|---|---|---|---|
| 3,639,015 | A * | 2/1972 | Maas ............................. | 384/536 |
| 4,722,618 | A * | 2/1988 | Matsumoto et al. .......... | 384/536 |
| 5,501,531 | A * | 3/1996 | Hamaekers ................... | 384/536 |
| 6,869,225 | B2 * | 3/2005 | Tatsumura .................... | 384/536 |
| 7,097,363 | B2 * | 8/2006 | Ostrander et al. ............ | 384/536 |
| 8,591,117 | B2 * | 11/2013 | Giraud et al. ................. | 384/536 |
| 8,628,250 | B2 * | 1/2014 | Oinuma et al. ............... | 384/536 |
| 2003/0002760 | A1 * | 1/2003 | Tatsumura .................... | 384/536 |
| 2007/0172167 | A1 * | 7/2007 | Lew .............................. | 384/536 |
| 2008/0095484 | A1 * | 4/2008 | Wirges et al. ................. | 384/536 |
| 2008/0205811 | A1 * | 8/2008 | Komori et al. ................ | 384/544 |
| 2008/0267549 | A1 * | 10/2008 | Yamada ........................ | 384/536 |
| 2008/0267550 | A1 * | 10/2008 | Hirakawa et al. ............. | 384/536 |
| 2008/0292232 | A1 * | 11/2008 | Wirthmann ................... | 384/536 |
| 2009/0152834 | A1 * | 6/2009 | Richter et al. ................ | 280/504 |
| 2013/0071243 | A1 * | 3/2013 | Kocher et al. ................ | 415/230 |
| 2013/0287330 | A1 * | 10/2013 | Ikeda ............................ | 384/536 |

FOREIGN PATENT DOCUMENTS

| | | |
|---|---|---|
| CN | 1816700 A | 8/2006 |
| EP | 1262672 A2 | 12/2002 |
| JP | 2000-170759 A | 6/2000 |
| JP | 2001-280342 | 10/2001 |
| JP | 2008-286221 | 11/2008 |

* cited by examiner

*Primary Examiner* — Nkeisha Smith
(74) *Attorney, Agent, or Firm* — Harness, Dickey & Pierce, P.L.C.

(57) ABSTRACT

The invention provides a center bearing support which can effectively suppress an inflow of a muddy water or the like into a center bearing side even at a time when a rotating shaft stops, without using a contact type seal such as an oil seal or the like. In a center bearing support in which an inner ring retaining a center bearing is provided in an inner periphery of an outer ring fixed to a vehicle body side via an elastic body made of a rubber-like elastic material, a rib guiding a flow of a muddy water or the like in a circumferential direction is formed on a convex surface constructed by a bellow-like bent portion of the elastic body.

6 Claims, 10 Drawing Sheets

CENTER BEARING SUPPORT

CROSS REFERENCE TO RELATED APPLICATIONS

The entire disclosure of Japanese Patent Application No. 2011-203047, filed Sep. 16, 2011 is expressly incorporated by reference herein.

BACKGROUND OF THE INVENTION

1. Field of the Invention

The present invention relates to a center bearing support which rotatably and elastically supports a propeller shaft of a motor vehicle to a vehicle body side via a center bearing and carries out a vibration absorption and a buffering.

2. Description of the Conventional Art

A center bearing which is installed to an outer periphery of a propeller shaft of a motor vehicle is elastically supported to a vehicle body side via a center bearing support, whereby a vibration transmission is reduced between the propeller shaft side and the vehicle body side under traveling.

As shown in FIG. 10 or FIG. 11, a center bearing support 100 of this kind is provided with an outer ring 101 which is fitted and attached to an annular bracket 110 in the vehicle body side, an inner ring 102 which is arranged in an inner periphery thereof and fitted and attached to an outer race 121 of a center bearing 120, a presser bar ring 103 which is fitted to the inner ring 102 so as to be integrated and holds the outer race 121, and an elastic body 104 which is made of a rubber-like elastic material (a rubber material or a synthetic resin material having a rubber-like elasticity), elastically coupling the outer ring 101 and the inner ring 102 and is formed as a bellow-like bent shape.

Further, among them, the center bearing support 100 shown in FIG. 10 is structured such that end portions 102a and 103a in an opposite side in an axial direction in the inner ring 102 and the presser bar ring 103 are bent to an inner diameter side so as to be opposed to an outer peripheral surface of a propeller shaft 130 via a slight gap, and oil seals 105 and 106 which are slidably brought into close contact with the outer peripheral surface of the propeller shaft 130 are installed to an inner peripheral surface of a tube portion in the vicinity of the end portions 102a and 103a in the inner ring 102 and the presser bar ring 103. Further, dust covers 107 and 108 which surround outer diameter sides of the end portions 102a and 103a of the inner ring 102 and the presser bar ring 103 are installed to the outer peripheral surface of the propeller shaft 130, whereby labyrinth seals LS1 and LS2 are formed in outer sides of the oil seals 105 and 106. Further, in accordance with the structure mentioned above, a muddy water, a dust or the like which comes flying during the traveling of the motor vehicle is prevented from making an intrusion into an inner peripheral space of the inner ring 102 and the presser bar ring 103 in which a grease (not shown) is filled and the center bearing 120 exists, for example, refer to Japanese Patent Publication No. 2008-286221.

However, since the oil seals 105 and 106 are contact type seals, a tension force thereof comes to a resistance against a rotation of the propeller shaft 130, thereby causing a loss of a driving force, that is, a deterioration of a fuel consumption. Further, since the oil seals 105 and 106 are embedded, there is a problem that a number of the parts is increased, and a cost is increased.

On the contrary, in the center bearing support 100 shown in FIG. 11, since the end portions 102b and 103b in the opposite side in the axial direction to each other in the inner ring 102 and the presser bar ring 103 are bent to the outer diameter side, and are opposed to the inner peripheral surfaces of a pair of dust covers 107 and 108 which are installed to the outer peripheral surface of the propeller shaft 130, the Labyrinth seal LS1 constructed by the zigzag bent gap is formed between the elastic body 104 and the end portion 102b of the inner ring 102, and the dust cover 107 and the outer peripheral surface of the propeller shaft 130, and the labyrinth seal LS2 constructed by the zigzag bent gap is formed between the end portion 103b of the presser bar ring 103 and the dust cover 108, and the outer peripheral surface of the propeller shaft 130. Further, in accordance with the structure mentioned above, the muddy water, the dust or the like which comes flying during the traveling of the motor vehicle is hard to make an intrusion into the inner peripheral space of the inner ring 102 and the presser bar ring 103 in which the grease (not shown) is filled and the center bearing 120 exists, for example, refer to Japanese Patent Publication No. 2001-280342.

However, in the structure in FIG. 11, a sealing performance of the labyrinth seals LS1 and LS2 is lowered, at a time of stopping, and at a time when a front wheel propeller shaft stops in the case of two-wheel drive traveling in a part-time four-wheel drive vehicle. Particularly, as shown by a broken line in the drawing, in the case that the muddy water is attached to an upper portion of a convex surface in an upper side of the propeller shaft 130 in the bellow-like bent portion of the elastic body 104, there is pointed out a problem that the muddy water falls down along the surface of the elastic body 104 so as to easily make an intrusion into the inner periphery of the inner ring 102.

SUMMARY OF THE INVENTION

Problem to be Solved by the Invention

The present invention is made by taking the points mentioned above into consideration, and a technical object of the present invention is to provide a center bearing support which can effectively suppress an inflow of a muddy water or the like into a center bearing side even at a time when a rotating shaft stops, without using a contact type seal such as an oil seal or the like.

Means for Solving the Problem

As a means for effectively solving the technical problem mentioned above, in accordance with the invention of claim 1, there is provided a center bearing support in which an inner ring retaining a center bearing is provided in an inner periphery of an outer ring fixed to a vehicle body side via an elastic body made of a rubber-like elastic material (a rubber material or a synthetic resin material having a rubber-like elasticity), wherein a rib extending in a circumferential direction is formed on a convex surface constructed by a bellow-like bent portion of the elastic body.

In accordance with the invention of claim 2, there is provided a center bearing support as described in claim 1, wherein the rib is provided by a plurality of rows in a region having an appropriate diametrical width around a top portion of the convex surface constructed by the bellow-like bent portion of the elastic body.

In accordance with the invention of claim 3, there is provided a center bearing support as described in claim 1 or 2, wherein a drainage groove intersecting the rib is formed at a position which comes to a lower side of the center bearing in the convex surface constructed by the bellow-like bent portion of the elastic body.

Effect of the Invention

On the basis of the center bearing in accordance with the invention of claim 1, in the case that the muddy water is attached to the convex surface in the upper side of the center bearing in the bellow-like bent portion of the elastic body, the flow of the muddy water caused by a gravitational force is dammed by the rib so as to be guided in the circumferential direction. Accordingly, since a flowing down toward the inner periphery of the inner ring is suppressed, it is possible to effectively prevent the muddy water from making an intrusion into the center bearing side.

On the basis of the center bearing in accordance with the invention of claim 2, even if the elastic body is exposed to such a deformation that the bent position thereof is changed, the ribs are provided over a plurality of rows. Accordingly, any rib tends to be retained by the convex surface in the upper side of the center bearing or in the upper side thereof, the effect of damming the muddy water by the rib can be further securely obtained.

On the basis of the center bearing in accordance with the invention of claim 3, the muddy water flowing down to the lower side of the center bearing on the surface of the elastic body while being guided in the circumferential direction by the rib is quickly discharged by the drainage groove which intersects the rib.

DETAILED DESCRIPTION OF PREFERRED EMBODIMENTS

A description will be given below of preferable embodiments of a center bearing support in accordance with the present invention with reference to the accompanying drawings. First of all, FIG. 1 to FIG. 3 show a first embodiment.

Figure 1:
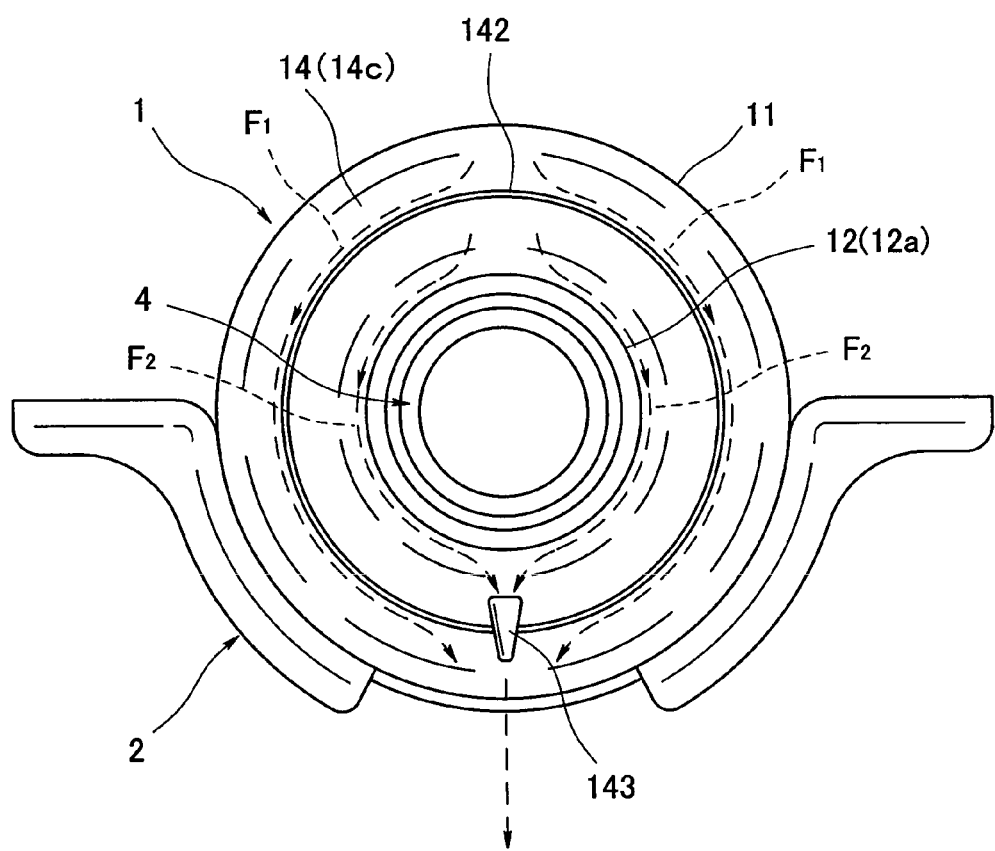
FIG. 1 is a view of a first embodiment of a center bearing support in accordance with the present invention as seen from a front side.
Figure 2:
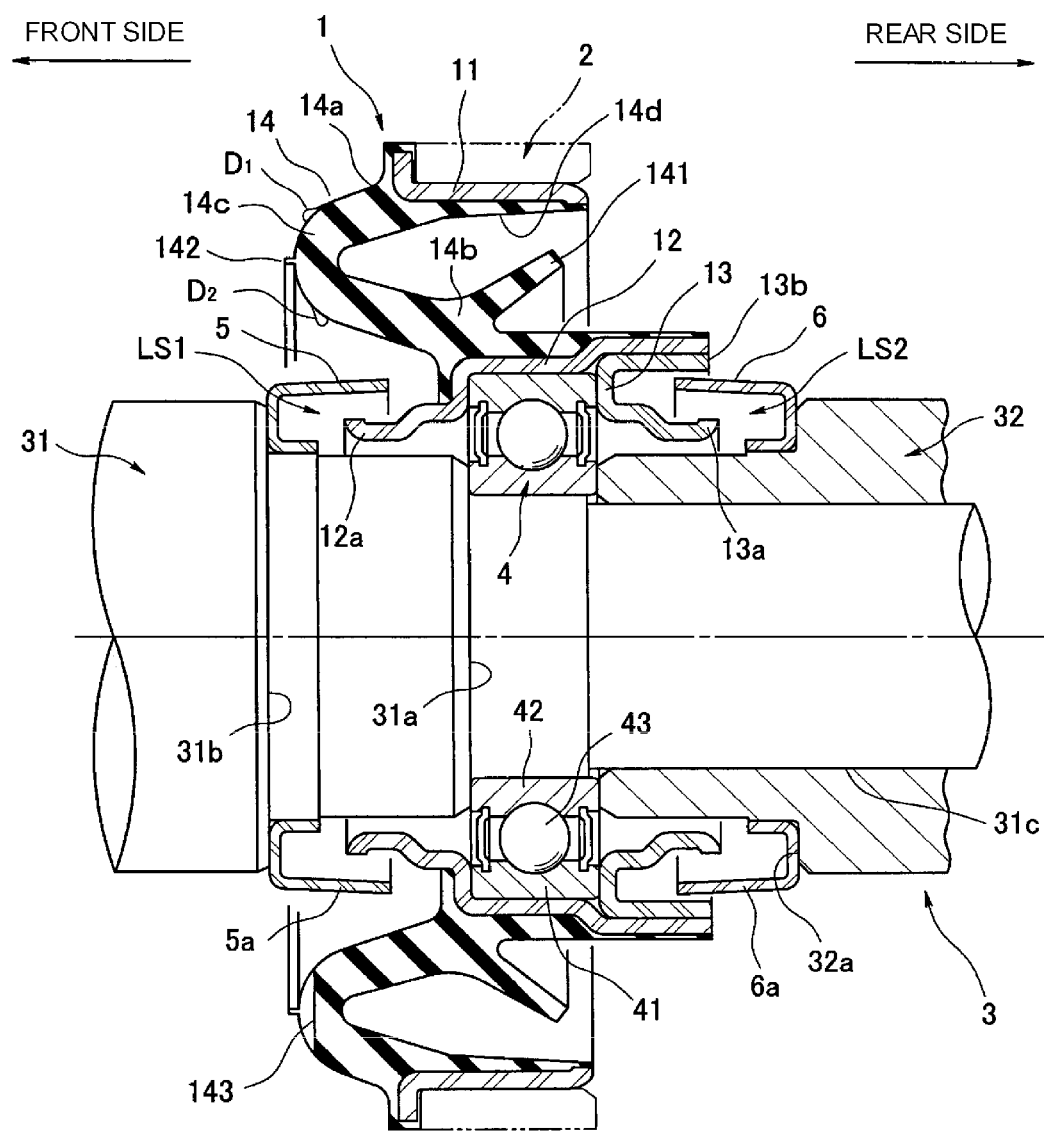
FIG. 2 is a cross sectional view of the first embodiment of the center bearing support in accordance with the present invention in an installed state, and shows by cutting by a plane passing through an axis.
Figure 3:
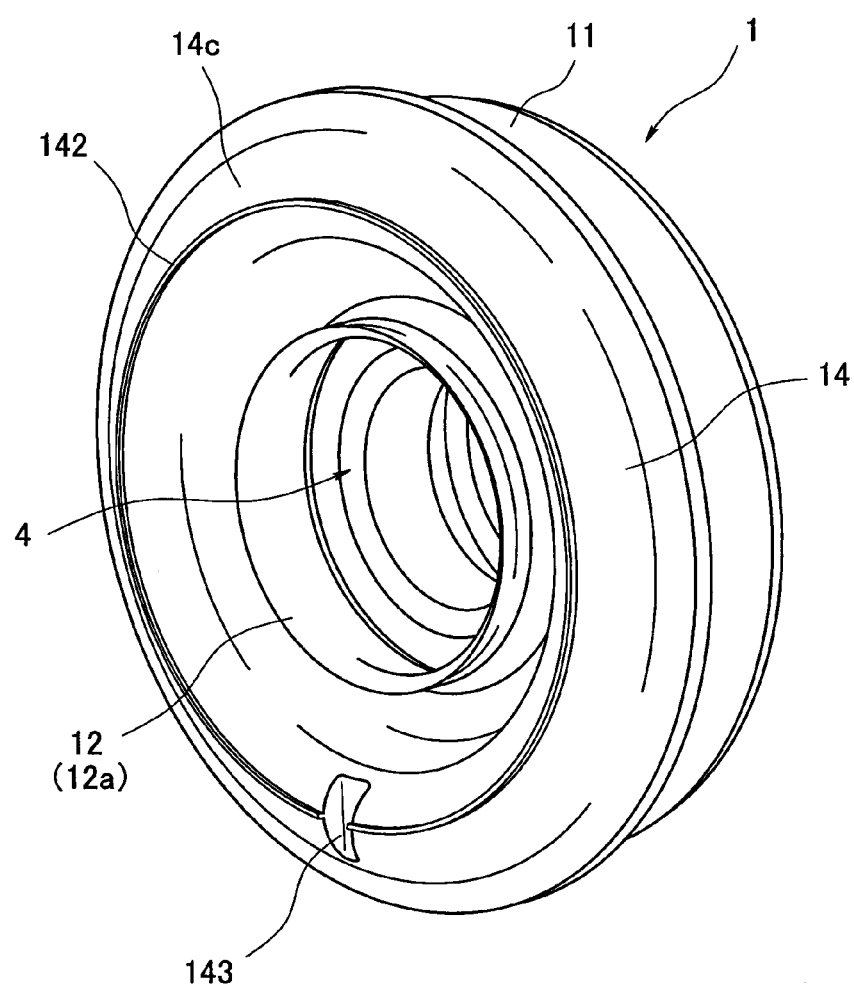
FIG. 3 is a perspective view showing the first embodiment of the center bearing support in accordance with the present invention.

Reference numeral 1 shown in FIG. 1 and FIG. 2 denotes a center bearing support in accordance with the first embodiment, reference numeral 2 denotes an annular bracket which is fixed to a vehicle body side via a mount or the like, reference numeral 3 shown in FIG. 2 denotes a propeller shaft, and reference numeral 4 denotes a center bearing. In this case, a left side in FIG. 2 is a front side of a motor vehicle and a right side is a rear side.

The propeller shaft 3 is constructed by a propeller shaft main body 31, and a collar 32 which is attached to an outer peripheral surface thereof, the propeller shaft main body 31 is formed so as to have a larger diameter sequentially from the rear side toward the front side by a plurality of step portions 31a and 31b, the collar 32 is installed to an outer peripheral surface 31c in the rear side from the smaller diameter side step portion 31a in the propeller shaft main body 31, and a step portion 32a which is symmetrical to the larger diameter side step portion 31b in the propeller shaft main body 31 is formed in an outer peripheral surface.

The center bearing 4 is a ball bearing having a known structure which is constructed by an outer race 41 and an inner race 42 which are coaxially arranged with each other, and a lot of steel balls 43 which are rotatably retained therebetween at uniform intervals in the circumferential direction, and portions between the steel ball 43, and the outer race 41 and the inner race 42 are lubricated by a grease which is not illustrated.

The center bearing support 1 in accordance with the first embodiment is constructed by an outer ring 11 which is pressure inserted and fitted to an inner periphery of the bracket 2 in the vehicle body side, an inner ring 12 which is arranged in an inner periphery of the outer ring 11 and is fitted to the outer race 41 of the center bearing 4 rotatably supporting the propeller shaft 3, a presser bar ring 13 which is fitted to the inner ring 12 so as to be integrated and holds the outer race 41, and an elastic body 14 which elastically couples between the outer ring 11 and the inner ring 12.

The outer ring 11, the inner ring 12 and the presser bar ring 13 are manufactured by a metal such as a steel material or the like, and the elastic body 14 is formed by a rubber-like elastic material (a rubber material or a synthetic resin material having a rubber-like elasticity). An outer peripheral end portion 14a of the elastic body 14 is integrally vulcanization bonded to the outer ring 11, an inner peripheral end portion 14b is integrally vulcanization bonded to an outer peripheral surface of the inner ring 12, and a bellow-like bent portion 14c which is bent as an approximately U-shaped cross section being convex to the front side is formed between the outer peripheral end portion 14a and the inner peripheral end portion 14b.

A conical tubular buffering stopper 141 is formed in a protruding manner in the inner peripheral end portion 14b of the elastic body 14, and a leading end thereof is opposed to the inner peripheral surface of the outer ring 11 which is covered by an elastic film portion 14b extending from the elastic body 14 in a diametrical direction at a predetermined distance. The buffering stopper 141 achieves a buffering function by being deformed between the outer ring 11 and the inner ring 12, at a time of inputting a vibration displacement having a relatively large amplitude between the vehicle body side and the propeller shaft 3.

The outer race 41 of the center bearing 4 is pressure inserted into an inner peripheral surface of an intermediate portion in an axial direction in the inner ring 12, and is pinched from both sides in the axial direction by the inner ring 12 and the presser bar ring 13, and the inner race 42 of the center bearing 4 is fitted to the outer peripheral surface of the propeller shaft main body 31, and is pinched from both sides in the axial direction by the step portion thereof and the collar 32.

A dust cover 5 which is positioned in the front side of the inner ring 12 and is made of the metal such as the steel material or the like is installed to the rear side of the large diameter side step portion 31*b* in the propeller shaft main body 31 of the propeller shaft 3, and a dust cover 6 which is positioned in the rear side of the presser bar ring 13 and is made of the metal such as the steel material or the like is installed to the front side of the step portion 32*a* in the collar 32 of the propeller shaft 3.

Among them, the dust cover 5 in the front side has a cover main body portion 5*a* which has a larger diameter in its leading end side from a fitted portion to the propeller shaft main body 31 and the collar 32 toward a space between the inner ring 12 and the bellow-like bent portion 14*c* of the elastic body 14, and extends like a conical tubular shape, an inner diameter portion of the inner ring 12 extends to the front side of the center bearing 4 from the fitted portion to the outer race 41 of the center bearing 4, and an end portion 12*a* thereof is bent to an outer diameter side and is opposed to the inner peripheral surface of the cover main body portion 5*a*. In accordance with this, a labyrinth seal LS1 constructed by a zigzag bent gap is formed between the end portion 12*a* of the inner ring 12 and the bellow-like bent portion 14*c* of the elastic body 14, and the dust cover 5 and the outer peripheral surface of the propeller shaft main body 31.

Further, the dust cover 6 in the rear side has a cover main body portion 6*a* which has a larger diameter in its leading end side from a fitted portion to the propeller shaft main body 31 and the collar 32 toward a space between a fitted portion 13*b* of the presser bar ring 13 to the inner ring 12 and an end portion 13*a* of the presser bar ring 13 positioned in an inner diameter side thereof, and extends like a conical tubular shape, an inner diameter portion of the presser bar ring 13 extends to the rear side of the center bearing 4 from contact portion with the outer race 41 of the center bearing 4, and the end portion 13*a* thereof is bent to an outer diameter side and is opposed to the inner peripheral surface of the cover main body portion 6*a*. In accordance with this, a labyrinth seal LS2 constructed by a zigzag bent gap is formed between the fitted portion 13*b* and the end portion 13*a* of the presser bar ring 13, and the outer peripheral surfaces of the dust cover 6 and the collar 32.

One row of annular rib 142 which continuously extends in the circumferential direction is formed in a top portion of the convex surface generated by the bellow-like bent portion 14*c* of the elastic body 14. The rig 142 protrudes vertically with respect to the convex surface, and is directed to the front side. Further, a magnitude and a shape of a cross section of the rib 142 are set such a degree that does not affect a surging frequency which generates a resonance of the bellows-like bent portion 14*c*.

Further, a drainage groove 143 is formed at a position which is just below the center bearing 4 in the convex surface formed by the bellow-like bent portion 14*c* of the elastic body 14. The drainage groove 143 is shallower than a thickness of the bellow-like bent portion 14*c*, that is, does not penetrate, and extends in a vertical direction in such a manner as to intersect the rib 142, in other words, in such a manner as to segment the rib 142. Further, the drainage groove 143 is formed wider in an inner diameter side (an upper side) and narrower in an outer diameter side (a lower side).

The center bearing support 1 which is provided with the structure mentioned above is structured such as to elastically and rotatably support the propeller shaft 3 to the bracket 2 in the vehicle body side via the center bearing 4. In the case that a vibration is generated in the rotating propeller shaft 3, the bellow-like bent portion 14*c* of the elastic body 14 repeatedly extends and contracts in conjunction with a relative eccentric motion between the inner ring 12 and the outer ring 11, and it is possible to effectively insulate a vibration transmission to the vehicle body side.

In this case, since the muddy water or the like which is going to make an intrusion into the center bearing 4 from the front side or the rear side has to pass through the zigzag bent labyrinth seal LS1 or LS2, it is extremely hard to make an intrusion. Further, the cover main body portions 5*a* and 6*a* of the dust covers 5 and 6 are formed as the conical tubular shape which becomes larger in diameter in the leading end side, they generate a chuck-off action by rotating together with the propeller shaft 3, and effectively inhibit the muddy water or the like from making an intrusion.

Further, since the labyrinth seal LS1 or LS2 is a non-contact type seal, a deterioration of the fuel consumption due to the sliding resistance is not caused as is different from the case that the contact type seal such as the oil seal is provided.

Further, since the chuck-off action caused by the rotation of the dust covers 5 and 6 as mentioned above runs short, at a time of stopping, and at a time when the front wheel propeller shaft stops in the case of two-wheel drive traveling in the part-time four-wheel drive vehicle, the sealing performance of the labyrinth seals LS1 and LS2 is lowered, however, in the case that the muddy water is attached, for example, to the surface in the upper side of the center bearing 4 (the propeller shaft 3) and the outer diameter side of the rib 142, in the bellow-like bent portion 14*c* of the elastic body 14, as shown by reference symbol D1 in FIG. 2 under the condition mentioned above, the falling of the muddy water D1 caused by the gravitational force is dammed by the rib 142, and reaches at a position which is just below the center bearing 4 so as to drop while being guided in the circumferential direction by the rib 142, as shown by a broken arrow F1 in FIG. 1. Accordingly, the inflow to the inner ring 12 side is suppressed, and the intrusion of the muddy water into the center bearing 4 side is effectively prevented.

In the same manner, in the case that the muddy water is attached, for example, to the surface in the upper side of the center bearing 4 (the propeller shaft 3) and the inner diameter side of the rib 142, in the bellow-like bent portion 14*c* of the elastic body 14, as shown by reference symbol D2 in FIG. 2, at a time of stopping, and at a time when the front wheel propeller shaft stops in the case of two-wheel drive traveling in the part-time four-wheel drive vehicle, the muddy water D2 flows down to the outer peripheral surface of the end portion 12*a* of the inner ring 12 from the diagonal surface of the inner diameter portion of the bellow-like bent portion 14*c*, flows to the lower side of the center bearing 4 while being guided in the circumferential direction by the end portion 12*a* of the inner ring 12 as shown by a broken arrow F2 in FIG. 1, flows further to the drainage groove 143 on the diagonal surface of the inner peripheral portion of the bellow-like bent portion 14*c* therefrom, and passes through the drainage groove 143 so as to drop. Accordingly, the falling to the inner ring 12 side is suppressed, and the intrusion of the muddy water into the center bearing 4 side is effectively prevented. In this case, since the drainage groove 143 is wider in the inner diameter side (the upper side), the muddy water from the upper side thereof tends to flow into.

Accordingly, even at a time of stopping, and at a time when the front wheel propeller shaft stops in the case of two-wheel drive traveling in the part-time four-wheel drive vehicle, it is possible to prevent the muddy water and the dust from being mixed into the grease which lubricates the center bearing 4, and effectively prevent the center bearing 4 from being damaged or deteriorated.

Further, the drainage groove 143 can be utilized as a circumferential direction positioning means at a time of installing the center bearing support 1 to the bracket 2. In this case, specifically, for example, a projection is provided in a jig for installing and is fitted to the drainage groove 143, whereby it is possible to position in the circumferential direction.

Further, since the drainage groove 143 is formed in such a manner as to be narrower in the outer diameter side (the lower side), it is possible to effectively suppress the muddy water intrusion from the below due to a splash of the muddy water from the road surface at a time when the vehicle travels.

Figure 4:
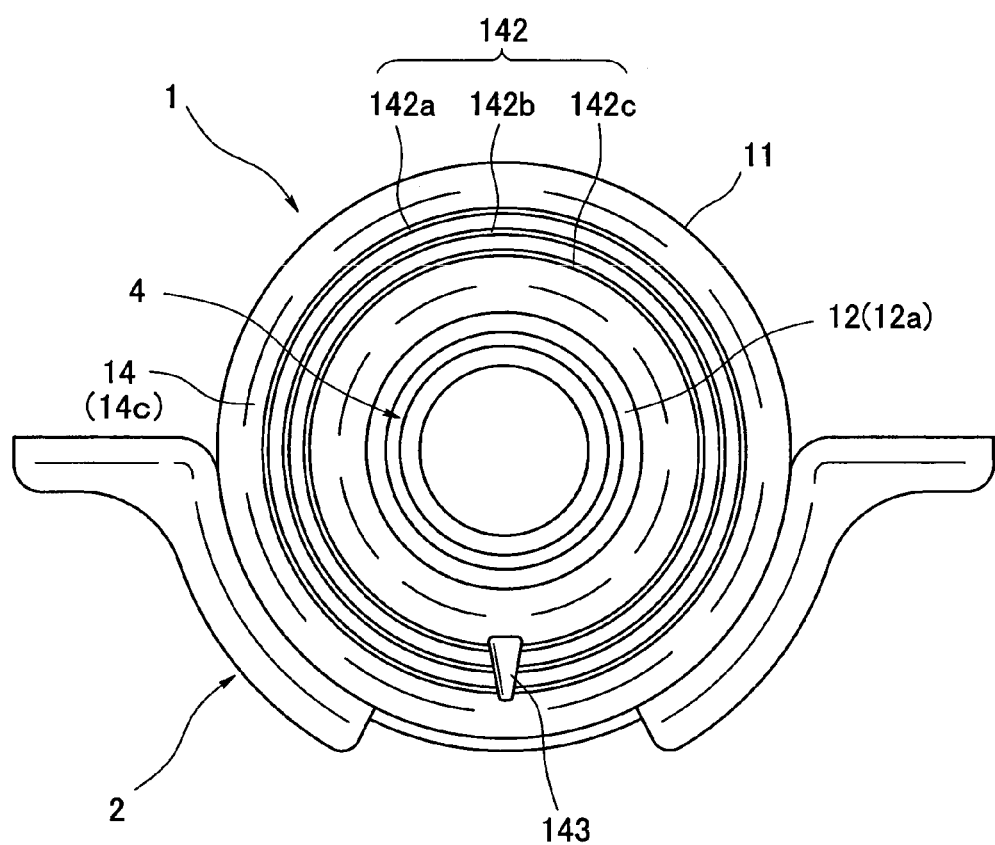
FIG. 4 is a view of a second embodiment of the center bearing support in accordance with the present invention as seen from a front side.
Figure 5:
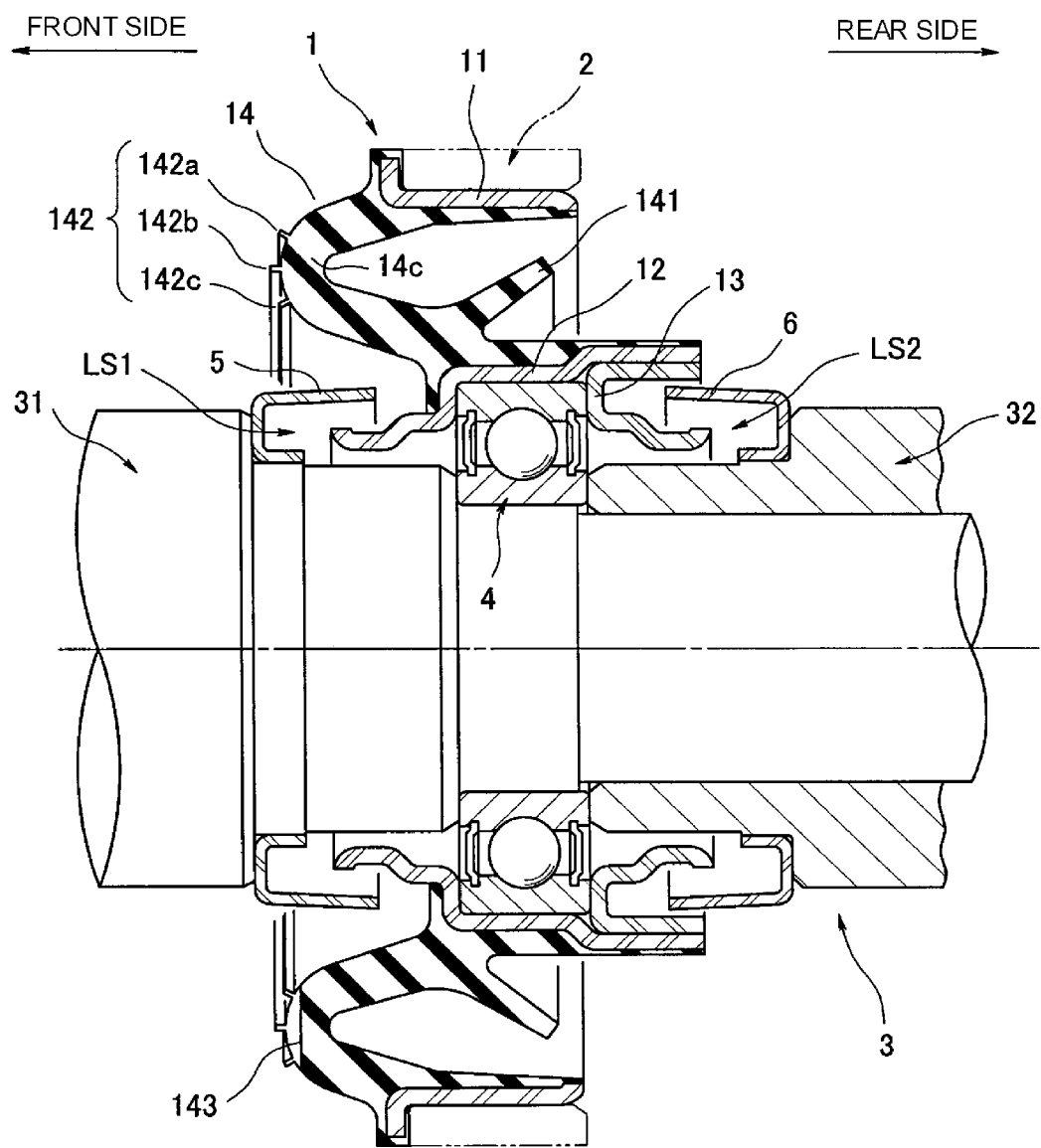
FIG. 5 is a cross sectional view of the second embodiment of the center bearing support in accordance with the present invention in an installed state, and shows by cutting by a plane passing through an axis.
Figure 6:
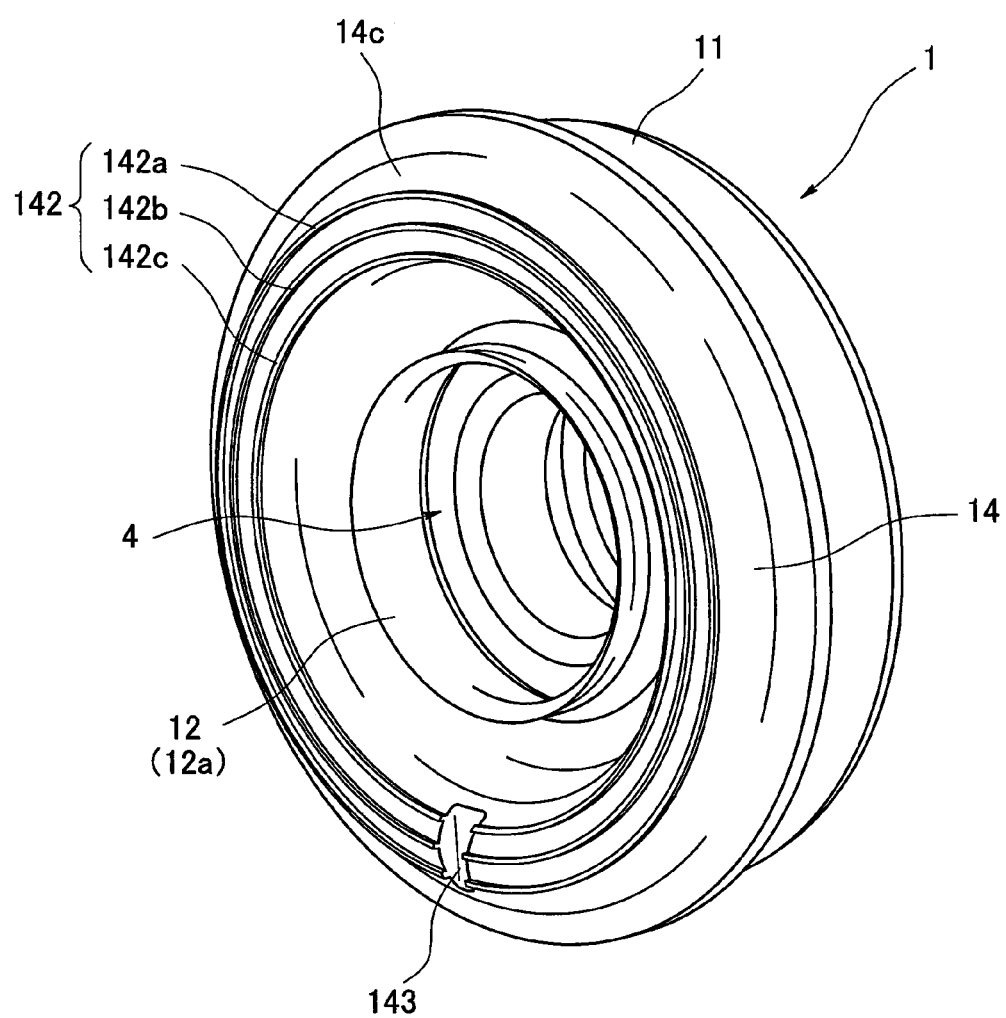
FIG. 6 is a perspective view showing the second embodiment of the center bearing support in accordance with the present invention.

Next, FIG. 4 to FIG. 6 show a second embodiment of the center bearing support in accordance with the present invention.

This second embodiment is different from the first embodiment mentioned above in a point that the ribs 142 are provided in a plurality of rows (three rows 142a to 142c in an illustrated example), in more detail, these ribs 142 (142a to 142c) are provided concentrically with each other in a region having an appropriate diametrical width around a top portion of a convex surface in the bellow-like bent portion 14c of the elastic body 14. In this case, the drainage groove 143 extends in a vertical direction in such a manner as to intersect all the ribs 142a to 142c, that is, in such a manner as to segment all the ribs 142a to 142c. The other portions can be basically structured in the same manner as the first embodiment.

In detail, the rib 142a exists closer to the outer diameter side than the top portion of the convex surface in the bellow-like bent portion 14c, the rib 142b extends approximately along the top portion of the convex surface in the bellow-like bent portion 14c, and the rib 142c exists closer to the inner diameter side than the top portion of the convex surface in the bellow-like bent portion 14c. Further, the ribs 142a to 142c all have the action of damming the muddy water flow from the upper side so as to guide the flow in the circumferential direction in the same manner as the rib 142 in accordance with the first embodiment, and the action is further securely achieved by providing a plurality of rows.

This is because even if the muddy water attached to the outer diameter side (the upper side) than the top portion of the convex surface in the below-like bent portion 14c climbs over the rib 142a in the outermost periphery so as to fall, for example, in the upper side than the center bearing 4 (the propeller shaft 3), the muddy water is dammed by the rib 142b so as to be guided its flow in the circumferential direction, and even if it climbs over the rib 142b so as to fall, it is further dammed by the rib 142c so as to be guided its flow in the circumferential direction.

Figure 7:
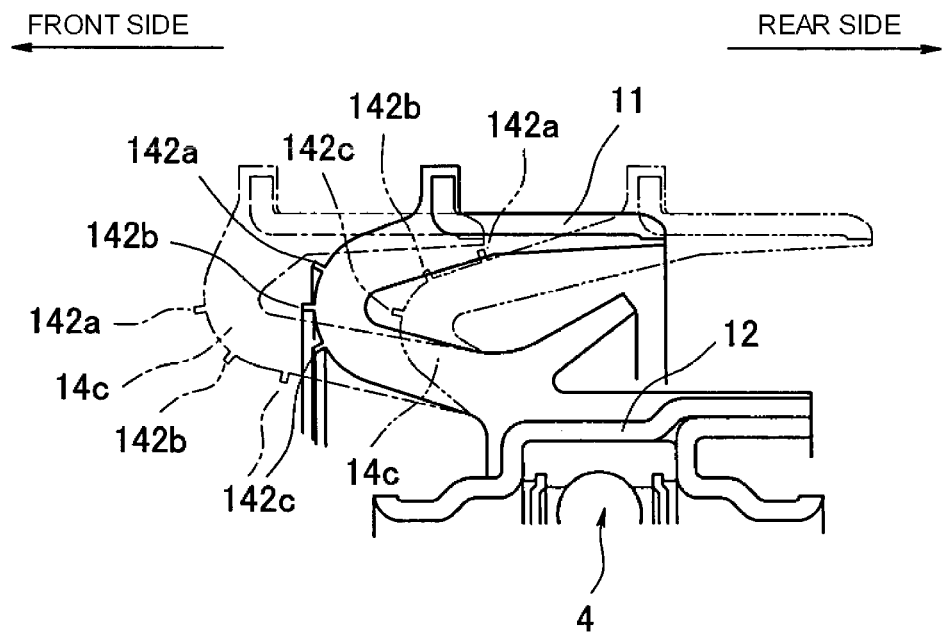
FIG. 7 is an action explanatory view showing the second embodiment of the center bearing support in accordance with the present invention.

Further, for example, as shown by a single-dot chain line in FIG. 7, in the case that the outer ring 11 displaces relatively to the front side with respect to the inner ring 12, the bent position (the top portion of the convex surface) in the bellow-like bent portion 14c of the elastic body 14 which is exposed to the deformation in conjunction therewith moves to the outer diameter side, however, since the rib 142a in the outermost periphery is positioned in the vicinity of the top portion of the convex surface in this state, the damming action and the guiding action in the circumferential direction of the muddy water can be achieved by the rib 142a.

Further, as shown by a two-dot chain line in FIG. 7, in the case that the outer ring 11 displaces relatively to the rear side with respect to the inner ring 12, the bent position (the top portion of the convex surface) in the bellow-like bent portion 14c of the elastic body 14 exposed to the deformation moves to the inner diameter side in conjunction therewith, however, since all the ribs 142a to 142c are positioned in the vicinity of the top portion of the convex surface or in the outer diameter side thereof under this state, the damming action and the guiding action in the circumferential direction of the muddy water can be stably achieved by the ribs 142a to 142c.

Figure 8:
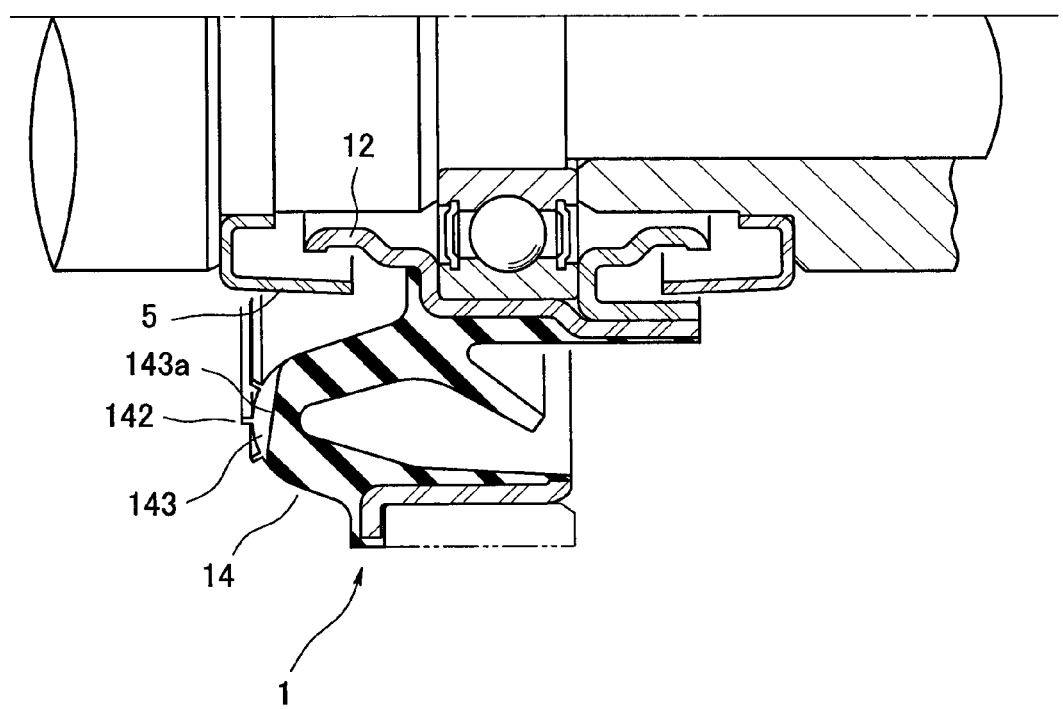
FIG. 8 is a half cross sectional view of an example in which a shape of a drainage groove in the second embodiment is changed, in an installed state and shows by cutting by a plane passing through an axis.
Figure 9:
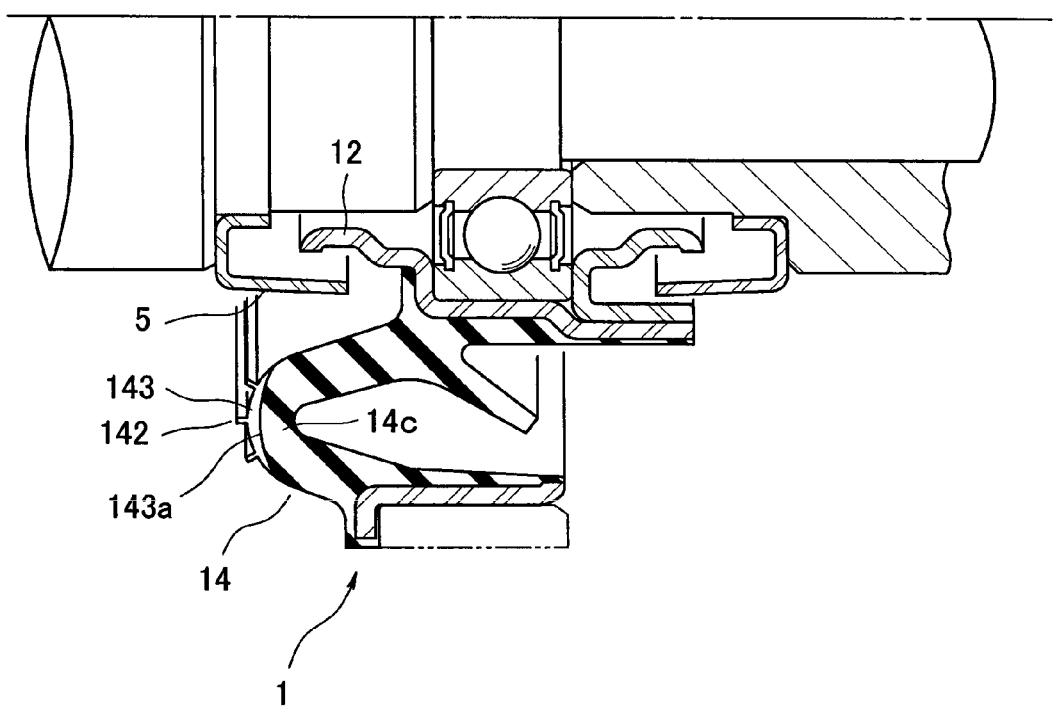
FIG. 9 is a half cross sectional view of an example in which a shape of a drainage groove in the second embodiment is changed, in an installed state and shows by cutting by a plane passing through an axis.
Figure 10:
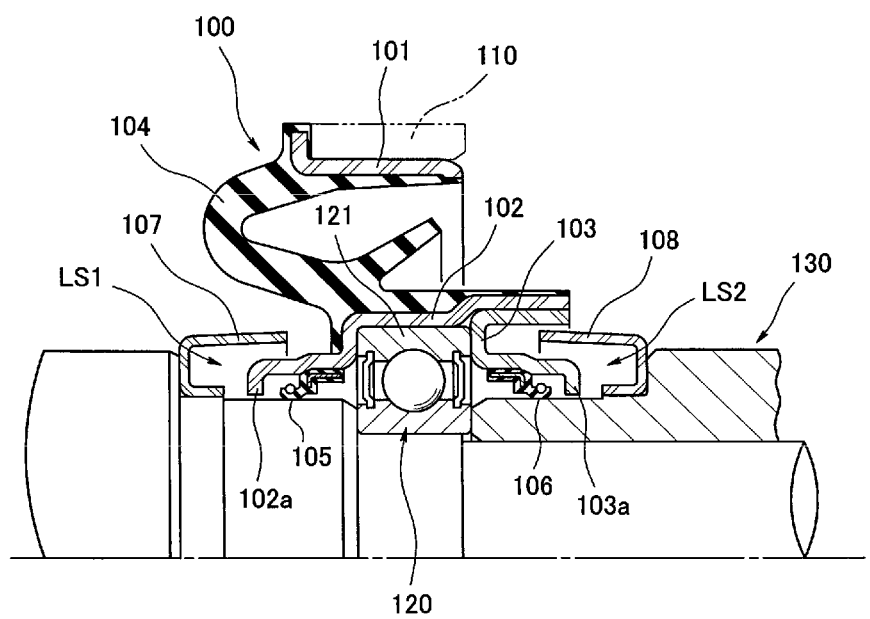
FIG. 10 is a half cross sectional view of a center bearing support in accordance with a prior art, in an installed state, and shows by cutting by a plane passing through an axis.
Figure 11:
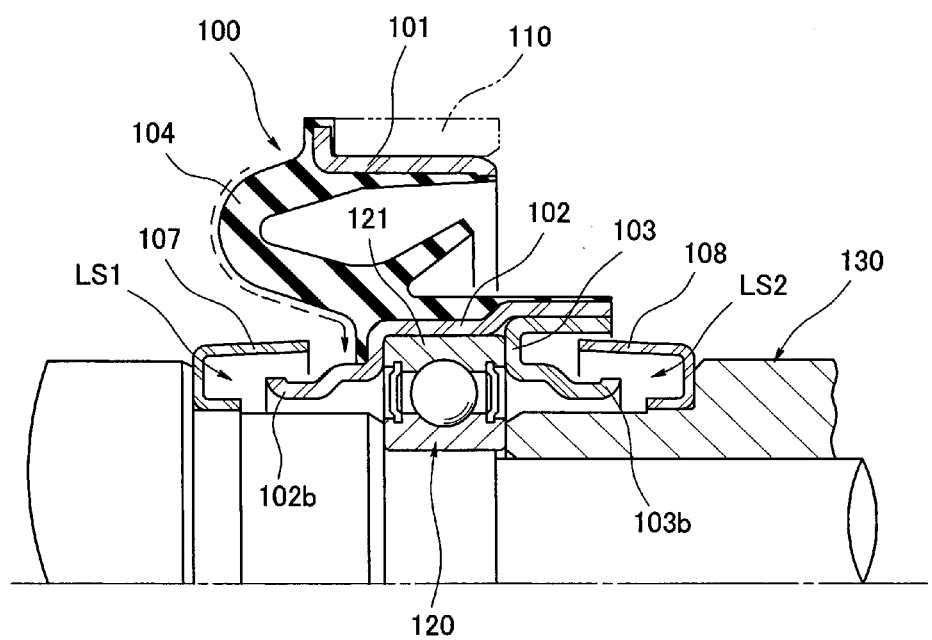
FIG. 11 is a half cross sectional view of a center bearing support in accordance with another prior art, in an installed state, and shows by cutting by a plane passing through an axis.

In this case, in each of the embodiments mentioned above, the groove bottom of the drainage groove 143 is shown as one extending approximately vertically in the drawings, however, it may be formed such a shape as shown in FIG. 8 or FIG. 9. An example shown in FIG. 8 among them is structured such as to improve the drainage performance and suppress the muddy water intrusion from the below, by inclining the groove bottom 143a in such a manner that the drainage groove 143 become shorter in the lower side and longer in the upper side than the top portion of the convex surface of the elastic body 14, and the drainage groove 143 shown in FIG. 9 is structured such as to suppress the spring property change and the durability reduction of the elastic body 14 due to the formation of the drainage groove 143 to a small level, by forming the groove bottom 143a as such a curved shape as to correspond to the convex surface in the bellow-like bent portion 14c of the elastic body 14.

Further, as shown in FIG. 1 or FIG. 4, the drainage groove 143 can be formed such that its width is wider in the inner diameter side (the upper side) and is narrower in the outer diameter side (the lower side), and the groove bottom 143a is formed such an inclined shape as shown in FIG. 8 or such a curved shape as shown in FIG. 9.

What is claimed is:

1. A center bearing support comprising:
    an outer ring fixed to a vehicle body via an elastic body made of an elastomeric material; and
    an inner ring retaining a center bearing provided in an inner periphery of said outer ring,
    wherein said elastic body includes:
        an outer peripheral end portion integrally vulcanized to said outer ring;
        an inner peripheral end portion integrally vulcanized to said inner ring; and
        a bent bellows portion formed between said outer peripheral end portion and said inner peripheral end portion;
    wherein a rib extending in a circumferential direction is formed on a vertex of a convex surface constructed by said bent bellows portion of said elastic body, said rib extending along a circumference of said bent bellows portion.

2. The center bearing support as claimed in claim 1, wherein the rib is provided by a plurality of rows in a region having a pre-selected diametrical width around a top portion of the convex surface constructed by the bent bellows portion of the elastic body.

3. The center bearing support as claimed in claim 1, wherein a drainage groove intersecting the rib is formed at a position extending to a lower side of the center bearing in the convex surface constructed by the bent bellows portion of the elastic body.

4. The center bearing support as claimed in claim 2, wherein a drainage groove intersecting the rib is formed at a position extending to a lower side of the center bearing in the convex surface constructed by the bent bellows portion of the elastic body.

5. A center bearing support comprising:
- an outer ring fixed to a vehicle body;
- an inner ring provided in an inner periphery of said outer ring;
- a center bearing retained by said inner ring;
- an elastic body between the outer ring and the inner ring, the elastic body being made of an elastomeric material and having a bent bellows portion;
- an annular rib extending in a circumferential direction directly from a convex surface of said bent bellows portion; and
- a drainage groove in the convex surface, said drainage groove segmenting the annular rib and extending to a lower side of the center bearing.

6. The center bearing support as claimed in claim 5, wherein the rib is provided by a plurality of rows in a region having a pre-selected diametrical width around a top portion of the convex surface.

\* \* \* \* \*